United States Patent Office 3,689,216
Patented Sept. 5, 1972

3,689,216
PRODUCTION OF HYDROGEN FLUORIDE FROM FLUOSILICIC ACID
Russell A. Brown, Idaho Falls, Idaho, assignor to Allied Chemical Corporation, New York, N.Y.
No Drawing. Filed Apr. 26, 1971, Ser. No. 137,618
Int. Cl. C01b 7/22, 7/00
U.S. Cl. 423—483      15 Claims

ABSTRACT OF THE DISCLOSURE

A process for producing gaseous anhydrous hydrogen fluoride from fluosilicic-containing solutions by forming an alkali metal fluosilicate and reacting said fluosilicate with excess $H_2SO_4$ at temperatures between 20° and 100° C. to produce gaseous silicon tetrafluoride and a fluoride-containing by-product and heating said by-product to a temperature between 80° to 300° C. to obtain the hydrogen fluoride product.

BACKGROUND OF THE INVENTION

This invention relates to a process for the recovery of hydrogen fluoride and more particularly to a process for recovering hydrogen fluoride from the waste gases produced in the acidulation of phosphate rock.

As is well known, chemically combined fluorine is usually present in substantially all of the mineral phosphates or the "phosphate rock" of commerce. Generally, such phosphate rock contains as much as 3–4% by weight of fluorine. When this phosphate rock is acidulated as, for example, with sulfuric or phosphoric acid, and subsequently, when the phosphoric acid is concentrated as in the production of phosphate fertilizers or wet-process phosphoric acid, a considerable portion of the fluorine value is released from the system as gaseous silicon tetrafluoride. Because of the noxious nature of this gas, it must be handled so as to avoid pollution of the atmosphere. Accordingly, it is customary to pass the gases which result from the acidulation of phosphate rock through water absorption towers or venturi scrubbers, to absorb the silicon tetrafluoride and yield a water solution of fluosilicic acid. As a result of this hydrolysis, insoluble silica is formed which is then separated, and the remaining solution of fluosilicic acid is either marketed as such or used in the manufacture of various fluosilicates which have industrial applications. While there is a limited market for the fluosilicic acid or for the fluosilicates derived therefrom, the market price of such compounds is not sufficiently high to make their production very attractive. It is, therefore, advantageous to be able to recover the fluorine values in the silicon tetrafluoride produced in such processes in a form which commands a higher market price as, for example, hydrogen fluoride.

In the past, numerous processes have been proposed for the recovery of the fluorine values as hydrogen fluoride, but generally such processes require operation at excessively high temperatures or under severe conditions. Some employ an excessive number of processing steps or consume uneconomic quantities of raw materials. Some of the proposed processes comprise a sequence of reactions, some of which produce undesirable by-products and a contaminated product hydrogen fluoride, often in low yield. Such processes require considerable expenditures, both in terms of operating expense and initial capital investment. Two-step processes for hydrogen fluoride recovery from fluosilicic acid are disclosed in U.S.P. Nos. 3,218,125 through 3,218,129, wherein silicon tetrafluoride and hydrogen fluoride are separated from a moderately concentrated sulfuric acid medium. This process has two disadvantages—a large volume of concentrated sulfuric acid is required per unit of fluosilicic acid and both steps of the process must be carried out at relatively high temperatures. For these reasons, the prior are processes for recovering hydrogen fluoride from the waste gases resulting from the acidulation of phosphate rock and the concentration of the phosphoric acid obtained therefrom, have not been economically attractive.

SUMMARY OF THE INVENTION

By-product fluosilicic acid, such as would be obtained from the acidulation or concentration step of a wet process phosphoric acid manufacturing unit or from a phosphate fertilizer manufacturing operation is treated to recover its fluorine values as anhydrous hydrogen fluoride. By-product fluosilicic acid from these sources would normally be an aqueous 15–30% solution. In addition, silicon tetrafluoride which is produced in the present invention, as will be described later, is hydrolyzed to produce additional fluosilicic acid. In the present process the fluosilicic acid-containing solution is reacted with an inorganic alkali metal salt. Preferably, the alkali metal is either sodium or potassium with potassium being especially preferred. While the salt may be derived from any of the inorganic mineral acids, preferably an alkali metal bisulfate or sulfate is employed because sulfuric acid is produced as a by-product and can be used in the acidulation of the phosphate rock. While reference herein below is made to potassium bisulfate and sulfate, it is intended to cover other inorganic alkali metal salts.

In addition to the alkali metal salt originally added, there is also charged into the reaction vessel the entire heel of potassium bisulfate or sulfate and sulfuric acid from the hydrogen fluoride generator, described hereinbelow, which represents the last step of the process. Sufficient make-up potassium bisulfate or sulfate should be added to the batch either in solid form or in solution to provide a slight excess of potassium ion over the stoichiometric quantity, sufficient to react with the fluosilicic acid solution to form a precipitate of fluosilicate as the potassium salt. One way in which this may be accomplished is by determining the fluosilicic acid still present in an aliquot portion by conventional means (after precipitation of the greater portion as potassium fluosilicate by the potassium ions already present), then adding about a 0 to 10% excess of potassium sulfate or potassium bisulfate over the stoichiometric quantity. The temperature range for the fluosilicate precipitation is not critical, but to minimize losses the precipitation should be carried out preferably within the range of 20° to 80° C. The agitated slurry is now filtered and the filtrate which consists of approximately 5 to 40% sulfuric acid, can be concentrated or returned without further treatment to the wet process phosphoric acid manufacturing facility or to the phosphate fertilizer manufacturing facility for the dilution of the $H_2SO_4$ used in the digestion of phosphate rock.

Preferably, the filter cake of potassium fluosilicate is given a water wash, and then transferred to a dryer maintained at a temperature of about 120° C. where the water content is reduced preferably to less than 1%. The dry potassium fluosilicate is next charged into a reaction zone, preferably equipped with agitation means, which is also vented to a silicon tetrafluoride hydrolyzer. In this reaction zone, about 1.5 to 6 times, preferably between 2 and 4 times, the stoichiometric quantity of concentrated sulfuric acid is added to the alkali metal fluosilicate to produce silicon tetrafluoride ($SiF_4$), which is driven off leaving a residual by-product of potassium bifluoride, potassium bisulfate and sulfuric acid. The reaction is carried out at temperatures between about 20° and 100° C., preferably within the range of about 25° to 60° C. The silicon tetrafluoride is liberated over a relatively short period of time without substantial loss of hydrogen fluoride. Actually, the reaction proceeds rapidly and completely at a temperature of about 25° C. It has been found that substantially all of the silicon tetrafluoride is rapidly evolved from the reaction vessel without the loss of hydrogen fluoride at temperatures below about 100° C. The amount of hydrogen fluoride lost during the silicon tetrafluoride evolution depends upon the amount of excess sulfuric acid used, the reaction temperature and the contact time in the reactor. Although contact times of as long as 10 minutes may be used, generally, about 4 to 8 minutes is sufficient. Loss of hydrogen fluoride approaches 10% at the longer reaction times, at higher temperatures and/or when a smaller amount of excess sulfuric acid is employed. When the process is carried out in the preferred ranges of time, temperature and sulfuric acid concentration, the loss of hydrogen fluoride with the silicon tetrafluoride is generally less than about 5%. Accordingly, a short contact time for the reaction between the sulfuric acid and the potassium fluosilicate is especially desirable, as well as adequate means for removing the evolved silicon tetrafluoride gas from the reactor. It has also been found especially desirable to conduct this reaction as well as the subsequent hydrogen fluoride removal step, described hereinbelow, under substantially anhydrous conditions. Since water may be introduced into the mixture from the precipitated alkali metal fluosilicate and/or from the sulfuric acid, it can be appreciated that the desired anhydrous conditions depend upon the sulfuric acid concentration as well as upon the degree to which the drying step of the alkali metal fluosilicate has been carried. Accordingly, the water content in the reaction mixture should be less than about 10% by weight, based on the acid present, but it is preferably kept to less than about 5% by weight.

After evolution of substantially all of the silicon tetrafluoride, the remaining fluoride-containing by-product comprises an alkali metal bisulfate an alkali metal bifluoride and sulfuric acid. This mixture is heated to, and maintained at a relatively high temperature until essentially all of the hydrogen fluoride, substantially free of silicon tetrafluoride, is evolved as an anhydrous gas. In this hydrogen fluoride generation step, the completeness of the hydrogen fluoride removal and the rate of evolution depends upon temperature, retention time in the reactor and the amount of sulfuric acid present. Although a contact time as long as about 2 hours may be used, it is preferred that the contact time be less than about 1 hour. The reaction temperatures may vary from about 80° C. to about 300° C. At temperatures above about 300° C. sulfur trioxide begins to evolve.

PREFERRED EMBODIMENT OF THE INVENTION

An operating temperature of about 100° to 200° C. is preferred because of the corrosion problems that would develop at the higher temperatures. Under the conditions within the preferred ranges specified, the evolved hydrogen fluoride contains less than 0.5% of water and less than 1% of silicon tetrafluoride.

In the preferred embodiment of the present invention, the residual mixture of the alkali metal (potassium) bisulfate and sulfuric acid remaining after the evolution of the hydrogen fluoride in the last processing step, is recycled to the precipitation vessel to provide the major portion of the potassium ions required for the precipitation of the potassium fluosilicate. As previously mentioned, only a small additional amount of make-up potassium sulfate or bisulfate is required.

The present invention also provides for the utilization of the evolved silicon tetrafluoride so as to eventually recover its fluorine values as hydrogen fluoride. This is accomplished by passing the silicon tetrafluoride gas into water, or preferably into a 5 to 15% solution of fluosilicic acid, wherein it is hydrolyzed to produce more fluosilicic acid with the precipitation of silica. The use of diluted fluosilic acid to hydrolyze the tetrafluoride has been found to provide a more easily filterable silica. The silica is removed, preferably during the hydrolysis, by circulating the solution through continuous separating means such as a continuous filter, since otherwise the slurry could become too thick for effective handling. The fluosilicic acid solution is thus brought to a concentration of between about 15 and 30%, preferably to about 20% $H_2SiF_6$. Preferably, it is then divided into two portions, one being diluted to between 5 to 15% to serve as the hydrolyzing medium for further additions of silicon tetrafluoride, whereas the second portion is combined with the fluosilicic acid process feed for conversion to potassium fluosilicate. The hydrolysis may be carried out within the range of 10 to 100° C., preferably between 20 and 70° C.

Example 1

240 parts of by-product 20% aqueous fluosilicic acid solution containing 48 parts of $H_2SiF_6$ are combined in a fluorocarbon-lined vessel with 480 parts of recycled 20% fluosilicic acid containing 96 parts $H_2SiF_6$. The fluosilicic acid solution is reacted with a 1:1 mixture of potassium sulfate and essentially 100% sulfuric acid, comprising 174 parts of $K_2SO_4$ and 174 parts of sulfuric acid. The temperature in the reaction vessel is maintained at 40° C. The precipitate of potassium fluosilicate which forms is filtered (to recover 850 parts of 32% $H_2SO_4$), and then washed with 250 parts of water, to remove the last of the sulfuric acid and other soluble impurities. The potassium fluosilicate is then dried at 120° C. until its water content is less than 1%. The concentration of the dilute sulfuric acid may be used to supplement that employed in the digestion of phosphate rock in wet-process phosphoric acid manufacture, or in the manufacture of phosphates and phosphate fertilizers. The dried fluosilicate salt (220 parts) is next reacted with 196 parts of 100% sulfuric acid in a fluorocarbon lined agitated vessel for 6 minutes at a temperature maintained at about 50° C. Substantially all of the thoretical silicon tetrafluoride (104 parts), and a small amount (less than 10% of the theoretical), of the hydrogen fluoride, are evolved. These gases are removed from the vessel and recycled in a manner to be explained later. The vented vessel containing the remaining fluoride mixture (312 parts) comprising 43% potassium bisulfate, 25% potassium bifluoride and 32% sulfuric acid (100%) is heated to 180° C. with agitation and maintained at this temperature for about 60 minutes, during which time substantially all of the remaining hydrogen fluoride of the mixture is evolved. The 36 parts of hydrogen fluoride obtained contain less than 0.5% of water and essentially no silicon tetrafluoride. The recovered hydrogen fluoride constitutes a yield of about 90% of theory.

245 parts of potassium bisulfate (about 90% of theory) remaining in the vented vessel after the hydrogen fluoride is evolved, is recycled for use in the succeeding run as the potassium fluosilicate precipitant.

The silicon tetrafluoride evolved from the reaction between the dry $K_2SiF_6$ and $H_2SO_4$ in the manner previously explained, is slowly sparged into a fluorocarbon-lined vessel (at a point near the bottom), containing 864 parts of 11.1% fluosilicic acid maintained at 30° C. The slurry is constantly circulated, by being removed from the bottom of the vessel and returned to the top, by employing a slurry pump. A portion of the slurry is constantly drawn from the system to a continuous filter wherein the silica cake is continuously removed and the filtrate is returned to combine with the circulating slurry. This simultaneous addition of $SiF_4$, circulation of the slurry, and removal of precipitated $SiO_2$, is continued until the concentration of the $H_2SiF_6$ reaches 20%. About 20 parts of silica are produced by the hydrolysis and removed by the continuous filter, leaving 960 parts of a 20% fluosilicic acid solution. One half of this amount, namely 480 parts, are held for recycle and the remaining 480 parts are diluted with 384 parts of water to again provide 864 parts of 11.1% fluosilicic acid. This is held for use in the hydrolysis step of the succeeding run, to convert the silicon tetrafluoride to additional fluosilicic acid.

Example 2

480 parts of 20% fluosilicic acid recycled from Example 1 are combined with 240 parts of 20% by-product fluosilicic acid to provide a combined 720 parts of 20% fluosilicic acid containing 144 parts $H_2SiF_6$. This charge is passed into a fluorocarbon-lined agitated vessel and treated with 245 parts of anhydrous potassium bisulfate recycled from the previous batch, 17 parts of make-up potassium sulfate and 86 parts of make-up 100% sulfuric acid. The temperature is maintained at 40° C. The precipitate of potassium fluosilicate is filtered (to thus recover 850 parts of 32% sulfuric acid as by-product), washed with water and dried at 120° C. until its water content is less than 1%. The dried potassium fluosilicate (220 parts) is next contacted with 294 parts of 100% sulfuric acid in a fluorocarbon-lined agitated and vented vessel for 10 minutes at a temperature maintained at 40° C. The gases evolved at this point represent substantially all of the theoretical silicon tetrafluoride (104 parts) and a small amount, less than 10% of the theoretical, of hydrogen fluoride. These gases are passed into the 864 parts of 11.1% fluosilicic acid which was prepared during the previous run. 20 parts of silica were filtered off, according to the continuous filtering procedure of Example 1, and discarded, leaving a clear filtrate of 960 parts of 20% fluosilicic acid. One half of this, 480 parts, is held for recycle to the succeeding batch. The second portion of 480 parts is diluted with 384 parts of water to provide 864 parts of an 11.1% fluosilicic acid solution for the hydrolysis of silicon tetrafluoride in the succeeding batch. The residual mixture remaining in the vented vessel after separation of the silicon tetrafluoride totals 410 parts comprising 33% potassium bisulfate, 19% potassium bifluoride and 48% sulfuric acid. Heat is next applied to the vented vessel bringing the temperature to 120° C., at which temperature the mixture is maintained with agitation for 120 minutes. During this period, substantially all of the remaining potassium bifluoride is converted to hydrogen fluoride which is evolved. The removed hydrogen fluoride, which amounts to about 36 parts, represents a yield of about 90%. It contains less than 0.5% of water and essentially no silicon tetrafluoride. 333 parts of potassium bisulfate and sulfuric acid remaining in the vented vessel after removal of the hydrogen fluoride (about 90% of theory) are recycled for use as the potassium fluosilicate precipitant in the succeeding batch.

Example 3

240 parts of by-product 20% fluosilicic acid containing 48 parts of the acid are combined with the 480 parts of 20% fluosilicic acid recycled from the previous batch in a fluorocarbon-lined agitated vessel. Here, the fluosilicic acid solution is treated with the heel from the HF generation step of the previous batch (Example 2) comprising 245 parts of anhydrous $KHSO_4$ and 88 parts of 100% $H_2SO_4$. 17 parts of make-up potassium sulfate are added, and the temperature maintained with agitation at 40° C. The precipitate of potassium fluorsilicate is filtered (to thus recover 850 parts of 32% $H_2SO_4$), washed with 250 parts of water and dried in the kiln at 120° C. until the water content is less than 1%. The dry potassium fluosilicate is next contacted with 392 parts of 100% sulfuric acid in a fluorocarbon-lined agitated and vented vessel for 8 minutes at a temperature maintained at 30° C. The gases evolved at this point represent substantially the theoretical quantity of the hydrogen fluoride. These gases are slowly bubbled through the 864 parts of 11.1% fluosilicic acid solution while the temperature is maintained at 30° C. The resulting 20 parts of silica produced during the hydrolysis is separated by filtration, according to the continuous procedure described in Example 1, yielding 960 parts of clear 20% fluosilicic acid. One half of this quantity, or 480 parts, is recycled to the succeeding batch wherein it will be combined with a by-product 20% fluosilicic acid which comprises the starting material. The other half, or 480 parts, is diluted with 384 parts of water to again provide 864 parts of 11.1% fluosilicic acid which will be used in hydrolyzing the silicon tetrafluoride from the following run. The by-product mixture remaining as a heel in the vented vessel after the evolution of the $SiF_4$ totals 508 parts, comprising 27% $KHSO_4$, 15% $KHF_2$ and 58% $H_2SO_4$. This mixture is next brought to a temperature of 180° C., while applying a vacuum of 26" of mercury to the system. This temperature is maintained for 10 minutes, during which time substantially all of the remaining hydrogen fluoride, amounting to 36 parts or 90% of theory, is evolved. The use of reduced pressure does not measurably improve the yield, and as a result of its application, much lower temperatures are required to condense the anhydrous HF product. The HF product removed contains less than 0.5% of water and essentially no silicon tetrafluoride. The potassium bisulfate and sulfuric acid mixture remaining in the vented vessel after removal of the hydrogen fluoride, which amounts to about 422 parts, or 90% of theory, is recycled to the first operation where it is held as the precipitant for the succeeding batch of fluosilicic acid.

Example 4

240 parts of by-product 20% fluosilicic acid containing 48 parts $H_2SiF_6$ are combined with 480 parts of 20% fluosilicic acid containing 96 parts of $H_2SiF_6$, which was recycled from the previous batch. This mixture comprising 720 parts of 20% $H_2SiF_6$ is charged into a fluorocarbon-lined agitated vessel. Here, the fluosilicic solution containing a total of 144 parts of $H_2SiF_6$ is treated with the heel from the HF generation step of the previous batch (Example 3) comprising 245 parts of anhydrous $KHSO_4$ and 177 parts of 100% $H_2SO_4$. 17 parts of potassium sulfate are added as make-up. The batch is agitated and maintained at 40° C. The precipitate of potassium fluosilicate is filtered (to thus recover 939 parts of 38.7% $H_2SO_4$), washed with about 250 parts of water and dried at 120° C. in a kiln until its water content is less than 1%. The dried potassium fluosilicate is then contacted with 490 parts of 100% sulfuric in a fluorocarbon-lined vented vessel for 10 minutes at a temperature maintained at 30° C. The gases evolved at this point represent substantially all of the theoretical silicon tetrafluoride and a small amount, less than 10% of the theoretical, of hydrogen fluoride. These gases are hydrolyzed by being bubbled through the 864 parts of 11.1% fluosilicic acid which were recycled from the previous batch. 20 parts of silica are precipitated, filtered, and discarded, using the method of continuous filtration described in Example 1. The filtrate now consists of 960 parts of 20% fluosilicic acid which may be used to supplement the feed of 20% by-product fluosilicic acid in future batches. The vented vessel containing the remaining residual by-product, totals about 606 parts, and comprises essentially 22.5% $KHSO_4$, 12.8% $KHF_2$ and 64.7% $H_2SO_4$. This mixture is next heated to 180° C. while bubbling a small amount of dry air (about 2 parts) through the mixture over a period of 10 minutes. The temperature and gas flow is maintained throughout this interval during which time substantially all of the remaining hydrogen fluoride is evolved. About 510 parts comprising about 245 parts of potassium bisulfate and the balance as 100% sulfuric acid (about 90% of theory), remain as heel in the vessel. This may be held for use as the precpitant in future batches in which potassium fluosilicate is to be precipitated from a fluosilicic acid solution. About 36 parts of hydrogen fluoride containing less than 0.5% moisture is obtained by condensation from the air stream as product, representing a yield of about 90% of theory. The use of the dry air did not contribute measurably to the yield of hydrogen fluoride obtained, and as a result of its use, extremely low temperatures were required to condense the anhydrous HF product.

These examples demonstrate the fact that an anhydrous hydrogen fluoride is obtainable from by-product fluosilicic acid in a process wherein potassium sulfate, sulfuric acid and silicon tetrafluoride are recycled, so that in addition to the raw material by-product fluosilicic acid, the only auxiliary chemicals required are 10% sulfuric acid and a small amount of make-up potassium sulfate or bisulfate. Furthermore, dilute sulfuric acid is obtained as by-product, the strength of which depends on the quantity of sulfuric acid chosen for the reaction with potassium fluosilicate. The sulfuric acid may be returned to the wet process phosphoric acid plant for the acidulation of phosphate rock.

This process provides an economic means of recovering fluorine values which would otherwise present a pollution problem to the phosphoric acid plant or the phosphate fertilizer plant wherein they are produced. The alkali metal fluosilicate which is precipitated is preferably the potassium salt. The sodium ion can also be used as the precipitant but the solubility of sodium fluosilicate is considerably higher in water and sulfuric acid than is the potassium salt. The energy requirement for the reaction between sodium fluosilicate and concentrated sulfuric acid is also appreciably higher than that between potassium fluosilicate and concentrated sulfuric; hence, the stated preference for the use of the potassium ion. In this precipitation step, it is unimportant whether the precipitant is added to the fluosilicic acid or the fluosilicic acid is added to the potassium sulfate or potassium bisulfate precipitant. The concentrated sulfuric acid added to the essentially dry alkali metal fluosilicate should preferably be present in a large excess (100% to 300%) to provide a liquid medium for the reaction. If the stoichiometric quantity is used, only a very narrow temperature range (20°–40° C.) can be tolerated. Above this range, a considerable amount of hydrogen fluoride is generated. When an excess of sulfuric acid is present, broader temperature ranges can be used such as 20 to 100° C., because the hydrogen fluoride formed is retained by the excess acid. On the other hand, too large an excess of sulfuric is impractical because the recovery of hydrogen fluoride from it, in the final reaction step, is difficult.

When an excess of sulfuric acid is used with the essentially dry alkali metal fluosilicate, the residual alkali metal bisulfate and sulfuric acid is substantially in a molten state. In recycling this residue, said residue may be added either in the molten or solid form to the fluosilicic acid solution.

The use of an applied partial vacuum, or of sweep gases in the HF generation step is not recommended, as much lower temperatures are then required to condense the anhydrous hydrogen fluoride product.

While there have been described herein various embodiments of the invention, the methods described are not to be understood as limiting the scope of the invention, as it is realized that changes therewithin are possible, and it is further intended that each element recited in the following claims is to be understood as referring to all equivalent elements for accomplishing substantially the same results in substantially the same or equivalent manner, it being intended to cover the invention broadly in whatever form its principle may be utilized.

What is claimed is:

1. A process for producing gaseous anhydrous hydrogen fluoride from an aqueous fluosilicic acid-containing solution, which comprises the steps of:
   (a) reacting said solution with a water-soluble inorganic alkali metal salt of sulfuric acid to form an alkali metal fluosilicate and sulfuric acid;
   (b) separating said alkali metal fluosilicate from the sulfuric acid in an essentially anhydrous state;
   (c) heating said fluosilicate at a temperature within the range of about 20° to 100° C. with about 1.5 to 6 times the stoichiometric quantity of sulfuric acid, having a concentration of at least 90%, whereby silicon tetrafluoride is evolved, leaving a fluoride-containing by-product comprising an alkali metal bisulfate, an alkali metal bifluoride, and sulfuric acid;
   (d) heating said fluoride-containing by-product at a temperature between about 100° and 300° C. for a sufficient time to evolve substantially silicon tetrafluoride-free hydrogen fluoride, whereby a residual mixture of alkali metal bisulfate and sulfuric acid remains.

2. The process of claim 1 wherein the alkali metal salt is selected from the group consisting of sodium and potassium.

3. The process of claim 1 wherein the alkali metal salt is a potassium salt.

4. The process of claim 1 wherein the alkali metal salt of sulfuric acid is selected from the group consisting of sulfate and bisulfate.

5. The process of claim 1 wherein the alkali metal fluosilicate separated from the sulfuric acid is dried to a moisture content of less than about 1.0%.

6. The process of claim 1 wherein the silicon tetrafluoride evolved is hydrolyzed in an aqueous solution to form a fluosilicic acid solution and silica, separating the precipitated silica, and treating the fluosilicic acid solution with the water-soluble inorganic alkali metal salt of sulfuric acid to form the alkali metal fluosilicate.

7. The process of claim 1 in which the residual mixture of alkali metal bisulfate and sulfuric acid remaining after the evolution of the hydrogen fluoride, is recycled to react with the fluosilicic acid-containing solution.

8. The process of claim 1 in which the sulfuric acid, produced simultaneously with the alkali metal fluosilicate, is used to treat phosphate rock to produce phosphoric acid and gaseous $SiF_4$ and preparing an aqueous fluosilicic acid-containing solution by passing the gaseous $SiF_4$ by-product into an aqueous solution.

9. The process of claim 1 wherein the alkali metal of said fluoride-containing by-product comprises potassium.

10. The process of claim 1 wherein the alkali metal of said residual mixture of alkali metal bisulfate comprises potassium.

11. The process of claim 1 wherein the sulfuric acid used throughout the process is essentially 100% sulfuric acid.

12. The process of claim 6 wherein the aqueous solution in which the silicon tetrafluoride is hydrolyzed is a dilute solution of fluosilicic acid.

13. The process of claim 12 wherein the aqueous fluosilicic acid in which the silicon tetrafluoride is hydrolyzed has an initial concentration of between 5 and 15% $H_2SiF_6$.

14. The process of claim 13 wherein the silicon tetrafluoride hydrolysis is continued until the strength of the fluosilicic acid reaches a concentration of between 15 and 30%.

15. The process of claim 13 wherein the precipitated silica formed during the hydrolysis is continuously removed from the slurry by circulating the slurry through separating means.

References Cited

UNITED STATES PATENTS

| | | | |
|---|---|---|---|
| 1,247,165 | 11/1917 | Stahl | 23—88 |
| 2,354,177 | 7/1944 | Kawecki | 23—153 X |
| 2,790,705 | 4/1957 | Kean et al. | 23—153 X |
| 3,256,061 | 6/1966 | Tufts et al. | 23—205 X |
| 3,257,167 | 6/1966 | Mohr et al. | 23—153 |

FOREIGN PATENTS 226,491  11/1925  Great Britain.

EDWARD STERN, Primary Examiner

U.S. Cl. X.R.

423—332, 520, 320; 23—182 R, 182 V, 341